Feb. 1, 1966   C. RUETSCHI   3,233,073
PROJECTION-WELDING METHOD FOR INSULATION-COATED SURFACES
Filed Feb. 1, 1963   3 Sheets-Sheet 1

3,233,073
PROJECTION-WELDING METHOD FOR INSULATION-COATED SURFACES
Charles Ruetschi, 31 Rue Leopold Robert,
La Chaux-de-Fonds, Switzerland
Filed Feb. 1, 1963, Ser. No. 255,511
Claims priority, application Germany, Feb. 5, 1962,
R 32,042
9 Claims. (Cl. 219—93)

When treating metals, a problem often arises, which consists in securing metal parts on surfaces carrying protecting, decorative or insulating layers, or again, layers of grease, oxide, varnish or lacquer.

Such layers prevent using convenient and economically superior resistance welding and required hitherto resorting to rivetting or the like expensive connecting methods when it was not preferred to clean correspondingly the parts to be interconnected at least at the location of the points to be welded. Such a cleaning increases however the cost of operation and, in certain cases, it can be executed only with the utmost difficulty. More specifically, this is the case when producing metal ornaments, type characters, medals, dials and toys and also electronic and electric parts such as insulated wires, tubes and semiconductors.

My invention has for its object a method which provides, in spite of the presence of such disturbing surface layers between the parts to be connected, the possibility of a resistance welding.

For this purpose, my invention covers the application against each other under elastic pressure of the two parts to be interconnected and of which at least one has first been provided with projections on its surface which is to engage the other part, while a relative vibratory movement is produced between the parts, which ensures a breaking through of the disturbing surface layer by said projections, that afterwards an elastic pressure is exerted on the parts to be interconnected and, lastly, the actual welding is obtained by subjecting the parts to short electric pulses passing through the contact points formed by the projections.

Hereinafter will be disclosed the requirements for the proper and successful execution of said method.

The height of the projections should be at least equal to the thickness of the surface layer increased by at least 0.1 mm. This extra thickness of at least 0.1 mm. is necessary because these projections enter somewhat during the welding procedure into the surface of the basic metal and, by reason of the welding pressure and raised temperature, they are slightly deformed. However, the actual part to be welded should not touch the surface layer.

The mechanical hardness of the projections should, of course, be at least as great as that of the surface layer to be destroyed.

In many cases, the shape of the projections is advantageously, for practical reasons of execution, that of a circular cone. Of course, other shapes may be given, for instance that of a pyramid. What is essential is that the cross-sectional areas of the projections decrease gradually towards the point of engagement with the cooperating part.

The pressure applied for vibration is adjusted according to the size and hardness of the projections and also to the layer to be broken through. The specific pressure at the points of contact should be selected in a manner such that the projections are not destroyed, even when they transiently rub against the basic metal forming the cooperating part. The pressure should be continued during the introduction of the projections into the surface layer, so that it must be an elastic pressure.

The amplitude of the vibratory movement ranges according to the case between 0.01 and 1 mm. It is defined by the size of the projections which, on the other hand, are designed in accordance with the size of the parts to be welded together. The area to be removed from the surface layer should be large enough so that the projections may not touch said layer during the welding, in order to prevent any detrimental effect on the welding procedure under the action, for instance, of the incorporation with the welding area of solid particles or of gases passing out of the heated portion of the surface layer. The amplitude of the vibratory movement should therefore be preferably sufficiently large.

In the case of round or pyramidal projections, the vibratory movement is advantageously circular, i.e. orbital, and this is obtained by starting with a small spiral movement which is transformed into a circular vibratory movement. The necessary tangential vibratory force to be applied to each projection is generally of the same order of magnitude as the vertical pressure exerted on each projection for urging the parts together.

The vibratory frequency defines together with the allowed compression, the duration of the vibratory procedure. In many cases, good results may be achieved with a comparatively small number of vibrations. Thus, for instance, about 100 vibrations are sufficient for the varnish layers to break through. With vibrations lasting one second, it is therefore possible to operate with the very low frequency of about 100 periods per second. Such vibratory frequencies can be obtained very simply.

It is often desired that the parts to be welded may be positioned with a great accuracy. At the end of the vibratory procedure, it is therefore necessary to set the parts in a very well-defined position with reference to each other. It is also, as already mentioned, of interest for the projections to lie during the welding procedure in the middle of the released areas of the surface layer and not to touch the surface layer by reason of the evolution of gases in the latter and also from aesthetic grounds.

The welding pressure per projection is selected in such a manner that the latter is practically not deformed at room temperature, but only at raised temperature. The pressure is thus determined by the size of the projections, the resistance of the material and the welding time. When the duration of welding is shorter, the heat remains more concentrated in registry with the points of welding and therefore the pressure may be higher. The welding pressure is, in most cases, higher than the pressure during the vibratory procedure. During welding, the projections enter into the molten basic metal of the cooperating part and are themselves subjected to a certain melting and deformation. The welding pressure must be an elastic pressure so that during the welding step it may remain operative, this remaining also true in the case of a speedy feed of the parts towards each other, while the welding is being executed.

The number of projections is selected in accordance with the desired total resistance. In the case of a welding cross-section of 0.1 sq. mm. of brass parts, resistances against traction and shearing above 2 kg. per projection have been obtained.

A machine for implementing my improved method should comprise the following features for the above-disclosed reasons:

(1) It should include means for the automatic feeding and positioning of the parts to be welded.

(2) A selected elastic pressure should be obtained for each element during the vibratory procedure.

(3) An adjustable amplitude of vibration should be maintained with a very high accuracy.

(4) The frequency of vibration should be adjustable.

(5) The duration of the vibratory period should be adjustable.

(6) The parts should be positioned at the end of the vibratory procedure in a manner such that the projections stand in the middle of the released portions of the surface layer.

(7) An adjustable elastic welding pressure should be obtained for each part.

(8) The duration of welding should be adjustable.

(9) The adjustable welding energy should be maintained constant with a great accuracy, independently of outer influences.

(10) The welding pressure should be automatically released at the end of the procedure and further parts to be welded should be fed in.

In the accompanying drawings given by way of example:

Figure 1A:
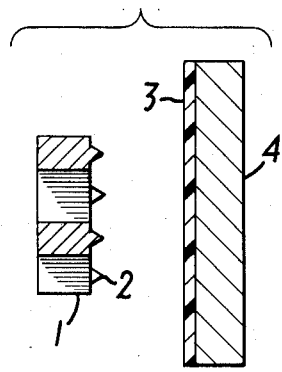
FIGS. 1A to 3B illustrate three successive steps of the procedure, FIGS. 1A, 2A and 3A being side views and FIGS. 1B, 2B and 3B being corresponding front views.
Figure 1B:
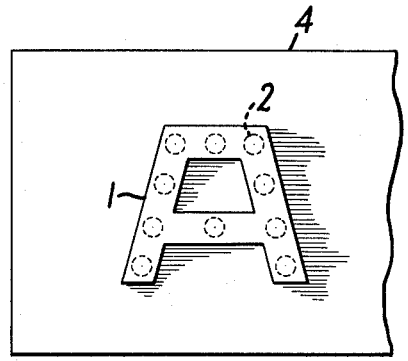
Figure 2A:
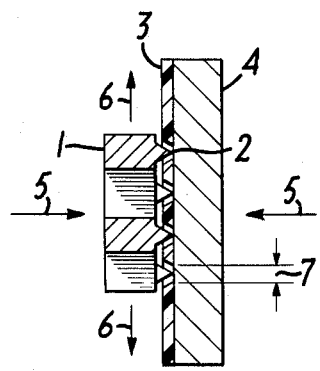
Figure 2B:
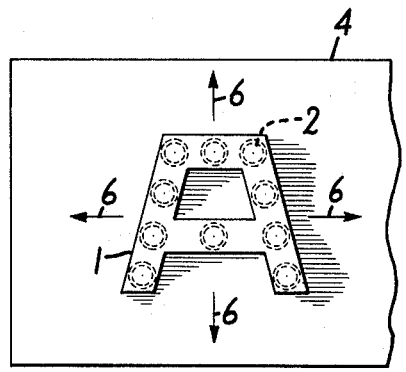
Figure 3A:
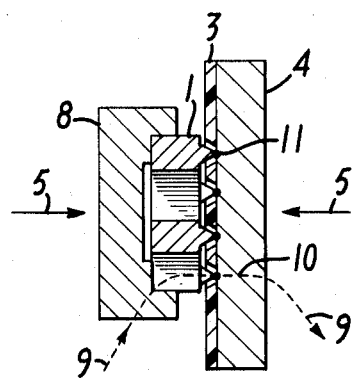
Figure 3B:
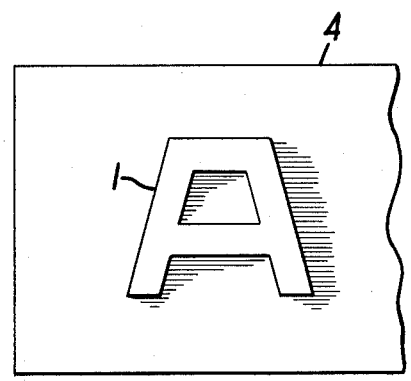

Turning to the drawings, FIGS. 1A, 2A and 3A are cross-sectional views of the elements to be welded, while FIGS. 1B, 2B and 3B show them in front view. In FIG. 1A, the parts 1 and 4 ready for the welding operation carry respectively projections 2 and a surface layer 3.

FIGS. 2A and 2B show the same parts at the end of the vibratory procedure, the arrows 5 illustrating the direction of the pressure applied, while the arrows 6 show various directions assumed by the vibratory movements. These vibratory movements, the amplitude of which is shown at 7, cause the projections 2 to break through the surface layer 3 and to touch the basic material 4 of the carrier element. The projections stand in the middle of the released surfaces.

FIGS. 3A and 3B show the arrangement after the actual welding procedure. The pressure corresponding to the arrows 5 is, in this case, a welding pressure. The electrode 8 feeds electric current 9 to the two parts, which current flows along the path shown, by way of example, at 10 in dotted lines and passing through the projections 2. The electric pulses act on the contact points so as to melt the material, which leads to the formation of welds at 11. The part 1 is shifted nearer the element 4 as a consequence of the welding procedure without however impinging against the surface layer 3, because the welding points should become solid under pressure. Subsequently, and after application of the welding pulses, it is possible to apply a final higher pressure.

Figure 4A:
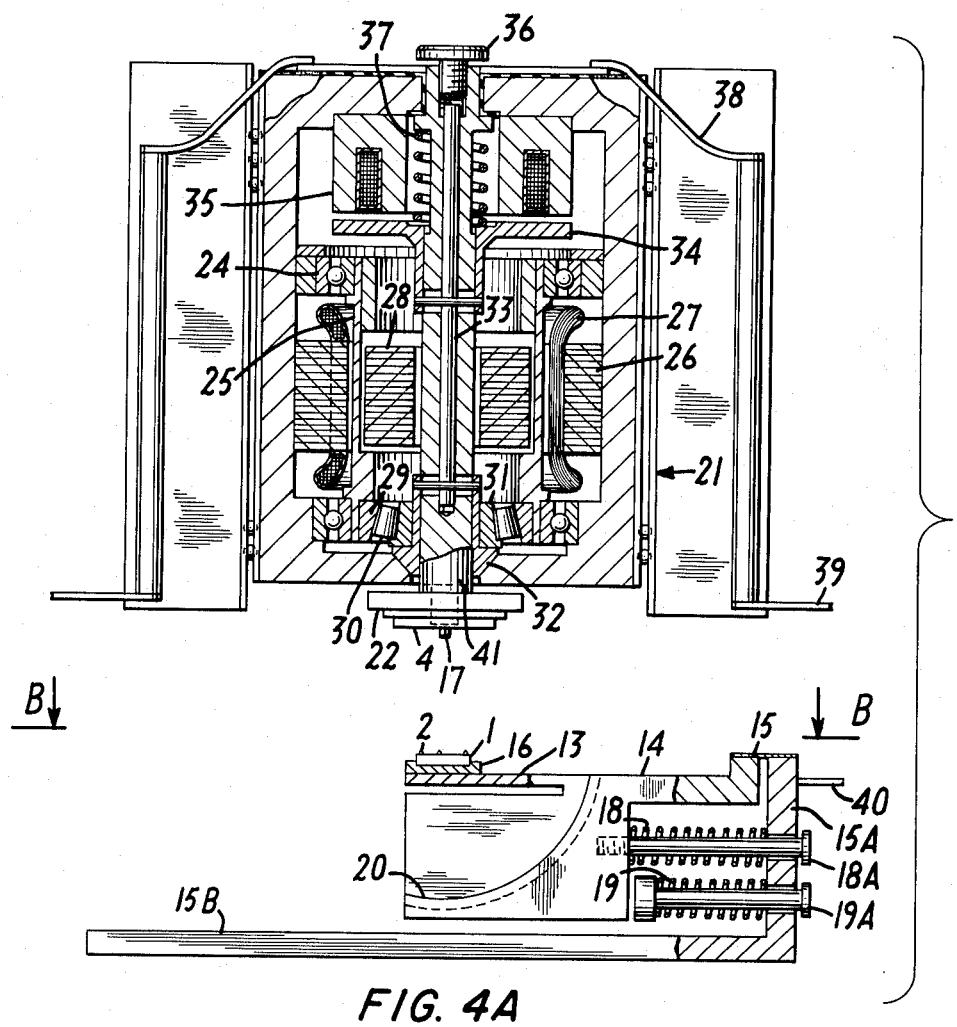
FIG. 4A illustrates a machine for the execution of my invention in axial cross-sectional view.
Figure 4B:
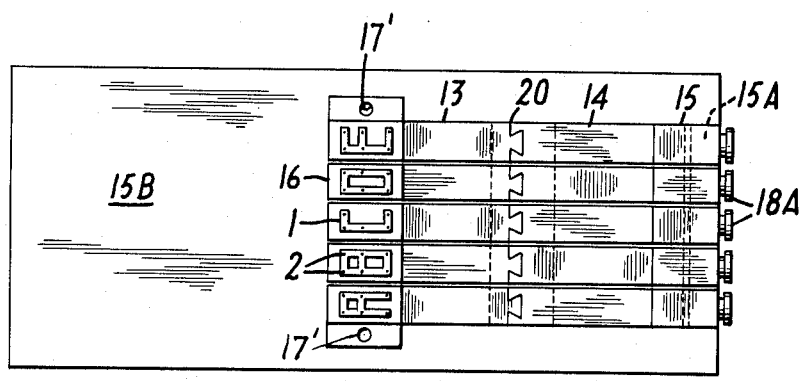
FIG. 4B is a plan view on the line B—B in FIG. 4A.

The machine illustrated in FIGS. 4A and 4B allows an especially easy implementation of the method disclosed.

The parts 1 to be welded carrying the projections 2, are laid on yielding blades 13 which are secured in their turn on rocking arms 14. The pivots of said rocking arms lie in the plane of the welding points and are constituted by metal strips 15, the edges of which are secured respectively to the arms 14 and a flange portion 15A of a base 15B. The electric welding pulses are fed from said strips 15 into the arms 14. The parts 1 are positioned by means of an electrically good conductive gauge 16 which is held in position in its turn by two guiding studs 17 carried by the upper section of the machine and fitting into corresponding holes 17' in gauge 16. The blades 13 are fitted on carriages 20 adapted to rotate round an axis extending through the welding points. This allows in a simple manner the parallel or tangential adjustment of the parts 1 with reference to the cooperating part. The blades 13 serve for maintaining the welding pressure during the short pulses of electric welding current during which the parts 1 are brought nearer the cooperating part. Springs 18 guided by plungers 18A are subjected to the vibratory pressure, whereas the springs 19 are subjected to the welding pressure. The springs 19 are retained by plungers 19A so as to act on the arms 14 only when these have rocked downwardly through a small angle.

The upper section of the machine illustrated in FIG. 4A slides vertically in guideways over a series of balls as shown at 21. This upper section includes a carrier plate 22 for the part 4 to be welded to the part 1, which part 4 carries a surface layer which would normally prevent welding. By urging the movable section of the machine downwardly until the parts 1 and 4 engage each other and the arms 14 are slightly shifted downwardly, the adjustable springs 18 produce a vibratory pressure; upon a still further progression of the movable machine section, the springs 19 also become operative and therewith the welding pressure is obtained, which is, practically in all cases, greater than the vibratory pressure.

The movable section of the machine includes a vibrator which satisfies the above-mentioned requirements in a particularly simple and elegant manner and produces a circular vibratory movement.

It includes an asynchronous motor, the rotor 25 of which revolves in the ball bearings 24, said rotor being constituted in the case illustrated by a simple aluminium tube. The cooperating stator 26 carries the winding 27 for the production of a high speed rotary field; the magnetic flux closes over the annulus 28. The rotor drives the outer race 29 of a conical roller bearing, the cage of which is filled less than one half of its periphery with rollers 30. The inner race 31 of the roller bearing is fitted on a sleeve 32 which may be shifted axially by the hollow rod 33 secured thereto by means of a transverse pin. The shifting of the rod 33 is controlled in the case illustrated by electromagnetic means, as provided by a second sleeve 34 including the armature of a yoke-shaped magnet 35. The sleeve 32 transmits the radial forces to the rod 41 passing through the latter and carrying the work-carrying plate 22 with the part 4 therein. The amplitude of the vibratory movements may be adjusted by the screw 36 limiting the path of travel of the rod 33. A spring 37 urges downwardly the sleeves 32 and 34 together with the rod 33 after deenergization of the magnet 35 whereby the vibration is stopped and simultaneously the frusto-conical end of the sleeve 32 ensures a centering or return of the vibrating member into a predetermined inoperative position.

The vibration-producing motor illustrated in FIGS. 4A and 4B allows a very large increase of the force produced by the rotor or a large reduction in the corresponding speed. It is therefore possible to obtain a very small size and an extreme reduction in the expenditure of material for the vibration-producing motor.

Obviously, in the application of the improved procedure according to my invention, it is possible to resort to other vibratory systems such, for instance, as centrifugal vibrators, electrodynamic or electromagnetic vibrators, oscillators of a magnetostrictive or piezoelectric type and the like.

The embodiment illustrated in FIGS. 4A and 4B shows however very great advantages as far as simplicity, price, adjustability of amplitude and the like are concerned.

The operation of the machine illustrated in FIGS. 4A and 4B is as follows: lowering of the movable upper machine parts into vibratory position; energization of the yoke-shaped electromagnet during the time required for vibration; further downward movement of the movable members into welding position for which both of the springs 18 and 19 are operative; starting of the welding pulses for which current flows over the terminals 40, the hinge 15, the arms 14, the blades 13, the gauges 16, the metal parts 1, the projections 2 into the cooperating parts 4 and thence through the carrier plate 22, its carrier rod 41 and the upper spring 38 back to the terminal 39; further downward movement of the movable members to provide a final higher pressure after application of the welding pulses; the return into their starting position of the movable members of the machine.

In FIG. 4A, it is possible, of course, to resort to the inner annulus 28 of the motor as a magnet urging upwardly the sleeve 32. The vibratory movement would then be released through starting and stopping of the motor.

Figure 5:
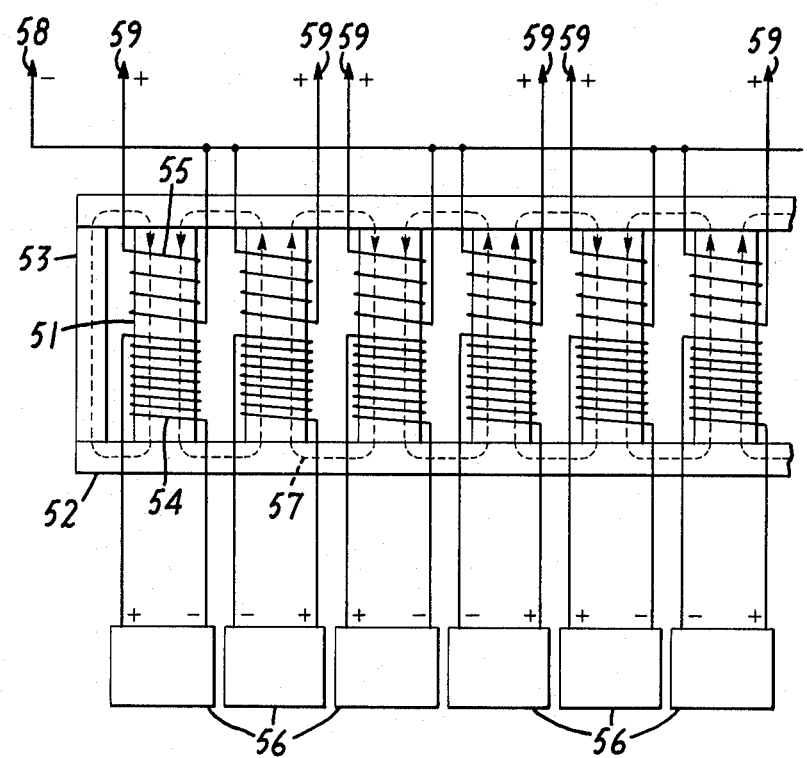
FIG. 5 is a wiring diagram thereof.

Turning now to the wiring diagram illustrated in FIG. 5, the latter shows the welding of a larger number of parts through the current from a welding transformer which is particularly favorable as concerns bulk and cost.

For each part to be welded, which is carried on a separate rockable arm, there is provided a transformer section 51 carrying the primary winding 54 together with the secondary winding 55 in close coupling relationship. All the transformer sections are interconnected by the connecting yokes 52. The compensating yoke 53 may be cut out, for instance, when there is a large number of sections; particularly, when the sections are arranged in a circle, the connecting yokes may be constituted by two annuli.

The electronic control system 56 feeds the primary winding 54 with current pulses which, for a given time, show the polarities + and −; the windings are connnected for this purpose in a manner such that the magnetic fluxes progress along the paths shown in interrupted lines. The common negative terminal connections 58 are connected with the terminal 39 of FIG. 4A, whereas the positive terminals 59 are connected with the terminals 30 of the rocking arm in FIG. 4A.

The arrangement illustrated leads to a reduction in the cost of the total iron weight of the transformer by about 40%.

What I claim is:

1. A resistance method for welding together two metal parts, of which one at least is coated on the surface to be welded by an insulating or impeding layer, consisting in providing on the surface of one part projections facing the coated layer on the other part, urging the two parts elastically together under pressure with the projections on one part facing the coating layer on the other part, subjecting the two parts to a relative vibratory movement in a direction substantially tangent to the contact surface between said parts and of an amplitude ranging between 0.01 and 1 mm. to make the projections break through corresponding areas of the coating layer, subjecting said parts to a welding pressure to urge said parts into contact, and feeding short electric welding pulses through the contact points between the projections and the areas of the coated part on which the coating layer has been broken through to weld only said projections of one part to the other part.

2. A resistance method for welding together two metal parts, of which one at least is coated on the surface to be welded by an insulating or the like impeding layer, consisting in providing on the surface of one part projections facing the coated layer on the other part, urging the two parts elastically together under pressure with the projections on one part facing the coating layer on the other part, subjecting the two parts to a relative vibratory movement in a direction substantially tangential to the contact surface between said parts and of a frequency ranging between 10 and 1,000 cycles per second to make the projections break through corresponding areas of the coating layer, subjecting said parts to a welding pressure to urge said parts into contact, and feeding short electric welding pulses through the contact points between the projections and the areas of the coated part on which the coating layer has been broken through to weld only said projections on one part to the other part.

3. A process for welding together two metal parts, of which at least one is coated on the surface to be welded with an insulating layer, comprising providing on the surface of one of said parts projections facing the other part, supporting one of said parts on an elastic support permitting movement of said part against a selected elastic force in a direction substantially perpendicular to the surface to be welded while holding said one part against movement parallel to said surface, pressing the other of said parts against said one part in a direction substantially perpendicular to said surface, subjecting one of the two parts to a vibratory movement with reference to the other in a direction substantially parallel to said surface and an amplitude at least as great as the diameter of contact areas of said projections to make said projections break through corresponding areas of the coating layer, stopping said vibratory movement and accurately positioning said parts relative to one another and feeding at least one short electric pulse through the contact points between said projections and the areas of the coated part where the coating layer has been broken through while the parts are pressed together to weld only said projections of one part to the other part.

4. A process according to claim 3, in which said vibratory movement is orbital.

5. A process according to claim 4 in which the areas where said coating is broken through are larger than the areas of contact between said projections on one part and the other part and in which said projections are substantially centered in said areas where said coating is broken through when said welding pulses are fed through said contact points.

6. A process for welding together two metal parts, of which at least one is coated on the surface to be welded with an insulating layer, comprising providing on the surface of one of said parts projections facing the other part, supporting one of said parts on a support permitting movement of said part against a selected elastic force in a direction substantially perpendicular to the surface to be welded, pressing the other of said parts against said one part in a direction substantially perpendicular to said surface, subjecting one of the two parts to a sub-ultrasonic vibratory movement with reference to the other in a direction substantially parallel to said surface to make said projections break through corresponding areas of the coating layer, stopping said vibratory movement and accurately positioning said parts relative to one another with said projections in said broken-through areas and feeding at least one short electric pulse through the contact points between said projections and the areas of the coated part where the coating layer has been broken through while the parts are pressed together to weld only said projections of one part to the other part.

7. A process for welding according to claim 6, in which said vibratory movement is translatory movement in an orbital path.

8. A process for welding according to claim 7, in which said areas are larger than the ends of said projections and in which said positioning of said parts positions the projections to register with the centers of the corresponding broken-through areas.

9. A process for welding according to claim 7, in which said vibratory movement has a frequency of the order of 10 to 1000 cycles per second and an amplitude of the order of 0.01 mm. to 1 mm.

(References on following page)

References Cited by the Examiner

UNITED STATES PATENTS

| | | | |
|---|---|---|---|
| 564,944 | 7/1896 | Sessions | 336—215 |
| 644,565 | 3/1900 | Arnold | 336—215 |
| 928,701 | 7/1909 | Rietzel | 219—93 |
| 1,229,700 | 6/1917 | Auel | 219—93 |
| 1,278,193 | 9/1918 | Murray | 219—117 |
| 1,390,050 | 9/1921 | Lee | 336—215 X |
| 1,739,617 | 12/1929 | Shaw | 336—215 X |
| 2,295,925 | 9/1942 | Biederman et al. | 219—87 |
| 2,300,538 | 11/1942 | Faulk | 219—117 X |
| 2,302,748 | 11/1942 | Da Rosa et al. | 219—87 |
| 2,432,750 | 12/1947 | Goldsworthy | 219—86 |
| 2,450,655 | 10/1948 | Goldsworthy | 219—93 |
| 2,847,556 | 8/1958 | Brennen et al. | 219—86 |

RICHARD M. WOOD, *Primary Examiner.*

R. F. STAUBLY, *Assistant Examiner.*